United States Patent
Sunada et al.

(10) Patent No.: US 9,080,019 B2
(45) Date of Patent: Jul. 14, 2015

(54) SULFUR-MODIFIED CHLOROPRENE RUBBER, MOLDED ARTICLE, AND METHOD FOR PRODUCING SULFUR-MODIFIED CHLOROPRENE RUBBER

(75) Inventors: Takashi Sunada, Itoigawa (JP); Naoki Kobayashi, Itoigawa (JP); Yasushi Abe, Itoigawa (JP)

(73) Assignee: DENKI KAGAKU KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/004,478

(22) PCT Filed: May 16, 2012

(86) PCT No.: PCT/JP2012/062457
§ 371 (c)(1),
(2), (4) Date: Sep. 11, 2013

(87) PCT Pub. No.: WO2012/157658
PCT Pub. Date: Nov. 22, 2012

(65) Prior Publication Data
US 2014/0005354 A1    Jan. 2, 2014

(30) Foreign Application Priority Data
May 17, 2011   (JP) .................. 2011-110307

(51) Int. Cl.
  *C08G 75/14*   (2006.01)
  *C08F 2/22*    (2006.01)
  *C08F 36/18*   (2006.01)
  *F16G 1/06*    (2006.01)
  *F16G 5/04*    (2006.01)
  *F16L 11/04*   (2006.01)
  *C08C 19/20*   (2006.01)

(52) U.S. Cl.
  CPC ............ *C08G 75/14* (2013.01); *C08F 36/18* (2013.01); *F16G 1/06* (2013.01); *F16G 5/04* (2013.01); *F16L 11/04* (2013.01); *C08C 19/20* (2013.01)

(58) Field of Classification Search
  CPC ............ C08F 2/22; C08F 36/18; C08C 1/14; C08C 19/20; C08G 75/14
  USPC ................... 526/234, 295; 528/389, 390
  See application file for complete search history.

(56) References Cited

U.S. PATENT DOCUMENTS

| | | | |
|---|---|---|---|
| 3,766,121 A * | 10/1973 | Fichteman | 524/846 |
| 4,255,539 A | 3/1981 | Branlard et al. | 525/330 |
| 4,482,676 A * | 11/1984 | Musch et al. | 525/215 |
| 4,678,848 A | 7/1987 | Walter | 526/220 |
| 4,895,906 A | 1/1990 | Wendling et al. | 525/194 |

FOREIGN PATENT DOCUMENTS

| | | |
|---|---|---|
| JP | 55-106210 A | 8/1980 |
| JP | 56-122812 A | 9/1981 |
| JP | 64-60603 A | 3/1989 |
| JP | 01-185309 A | 7/1989 |
| JP | 2001-131234 A | 5/2001 |
| JP | 2002-060550 A | 2/2002 |
| JP | 2009-275124 A | 11/2009 |

OTHER PUBLICATIONS

International Search Report mailed Aug. 14, 2012, issued in corresponding International Application No. PCT/JP2012/062457.

* cited by examiner

*Primary Examiner* — Fred M Teskin
(74) *Attorney, Agent, or Firm* — Stein IP, LLC

(57) ABSTRACT

This invention provides a means to produce improved sulfur-modified chloroprene rubber for use in making products with improved heat resistance. The products of the invention require sulfurization of the chloroprene followed by plasticization. A preferred plasticizer is tetraethylthiuram.

15 Claims, No Drawings

SULFUR-MODIFIED CHLOROPRENE RUBBER, MOLDED ARTICLE, AND METHOD FOR PRODUCING SULFUR-MODIFIED CHLOROPRENE RUBBER

CROSS-REFERENCE TO RELATED APPLICATIONS

This application is a national stage application of PCT Application No. PCT/JP2012/062457, filed on May 16, 2012, which claim the benefit of Japanese Application No. 2011-110307, filed May 17, 2011, in the Japanese Patent Office. All disclosures of the document(s) named above are incorporated herein by reference.

BACKGROUND OF THE INVENTION

1. Field of the Invention

The present invention relates to a sulfur-modified chloroprene rubber, a molded article thereof, and a method for producing the sulfur-modified chloroprene rubber. It specifically relates to a sulfur-modified chloroprene rubber and a molded article thereof favorably used as a material for rubber products for use in applications under dynamic environment, such as transmission belts and conveyer belts for use in industries in general, air springs for use in automobiles, antivibration rubbers and others, and also to a method for producing the sulfur-modified chloroprene rubber.

2. Description of the Related Art

Sulfur-modified chloroprene rubbers, which show favorable dynamic properties, have been used as materials for transmission belts and conveyer belts for use in industries in general, air springs for automobiles, antivibration rubbers and others. These products have a problem that they deteriorate gradually and show decrease in product lifetime when they are used under higher-temperature environment. For that reason, there existed a need for development of a sulfur-modified chloroprene rubber improved in heat resistance.

Known as the means of improving the heat resistance of sulfur-modified chloroprene rubbers are, for example, a method of using a special tetraalkylthiuram disulfide during plasticization (peptization) of sulfur-modified chloroprene rubbers (see Patent Document 1) and a method of adding an unsubstituted or substituted thiazolidinethione-2 and an imidazole group-containing compound (see Patent Document 2).

CITATION LIST

Patent Literatures

[Patent Document 1] Japanese Unexamined Patent Application Publication No. 2009-275124
[Patent Document 2] Japanese Unexamined Patent Application Publication No. 2002-060550

SUMMARY OF THE INVENTION

Technical Problem

However, only with the technologies described in Patent Documents 1 and 2, it was still insufficient to improve the heat resistance, especially under severe use conditions. Thus to cope with the use environment, which was becoming stricter and stricter, there existed a need for development of a sulfur-modified chloroprene rubber drastically improved in heat resistance.

Thus, major objects of the present invention are to provide a sulfur-modified chloroprene rubber improved in heat resistance, a molded article prepared by using the sulfur-modified chloroprene rubber and a method for producing the sulfur-modified chloroprene rubber.

Solution to Problem

Accordingly, the sulfur-modified chloroprene rubber according to the present invention is a sulfur-modified chloroprene rubber comprising, as the principal component, a sulfur-modified chloroprene polymer having sulfur atoms in the molecule which is obtained by emulsion polymerization of chloroprene alone or a mixture of chloroprene and one or more other monomers in the presence of sulfur, wherein the content of the sulfur that is bound to the sulfur-modified chloroprene polymer is 0.2 to 0.6 mass % with respect to the total amount of the rubber and the ratio of the amount of the bound sulfur (mass %) to the total amount of the sulfur contained in the entire rubber (mass %) (bound sulfur content/total sulfur content) adjusted to 0.28 to 0.5.

In the sulfur-modified chloroprene rubber, the polymerization degree of the sulfur-modified chloroprene polymer may be 60 to 95%.

The sulfur-modified chloroprene rubber may be prepared by emulsion polymerization of the raw monomer mixture containing monomers copolymerizable with chloroprene in an amount of 10 mass % or less.

The molded article according to the present invention is obtained from the sulfur-modified chloroprene rubber described above.

Examples of the molded articles include transmission belts and conveyer belts for use in industries in general, antivibration rubbers, air springs for automobiles, hoses, sponges and the like.

The method for producing a sulfur-modified chloroprene rubber according to the present invention is a method for producing a sulfur-modified chloroprene rubber, comprising a polymerization step of obtaining a sulfur-modified chloroprene polymer containing sulfur atoms in the molecule by emulsion polymerization of chloroprene monomer alone or a mixture of chloroprene and one or more other monomers in the presence of sulfur and a step of isolating the sulfur-modified chloroprene rubber from the polymerization solution obtained in the polymerization step by freeze-solidification method, wherein the content of the sulfur that is bound to the sulfur-modified chloroprene polymer is 0.2 to 0.6 mass % with respect to the total amount of the rubber and the ratio of the amount of the bound sulfur (mass %) to the total amount of the sulfur contained in the entire rubber (mass %) (bound sulfur content/total sulfur content) adjusted to 0.28 to 0.5.

The method for producing a sulfur-modified chloroprene rubber may comprise, before the step of isolating the sulfur-modified chloroprene rubber, additionally a pH-adjusting step of adjusting the pH of the polymerization solution containing the sulfur-modified chloroprene polymer to 5.5 to 7.5 before isolation of the sulfur-modified chloroprene rubber by the freeze-solidification method.

The polymerization step may be carried out to a polymerization degree of the sulfur-modified chloroprene polymer at 60 to 95%.

In the polymerization step, a raw monomer mixture containing the other monomers in an amount of 10 mass % or less may be used for emulsion polymerization.

Advantageous Effects of Invention

The present invention provides a sulfur-modified chloroprene rubber improved in heat resistance, a molded article prepared by using the sulfur-modified chloroprene rubber and a method for producing the sulfur-modified chloroprene rubber.

Additional aspects and/or advantages of the invention will be set forth in part in the description which follows and, in part, will be obvious from the description, or may be learned by practice of the invention.

DETAILED DESCRIPTION OF THE EMBODIMENTS

The embodiments are described below in order to explain the present invention by referring to the examples, which are illustrative of the invention, but the examples should not be deemed to limit the scope of the invention.

First Embodiment

<Sulfur-Modified Chloroprene Rubber>

First, a sulfur-modified chloroprene rubber in the first embodiment of the present invention will be described. The sulfur-modified chloroprene rubber of the present embodiment contains, as the principal component, a sulfur-modified chloroprene polymer obtained by emulsion polymerization of 2-chloro-1,3-butadiene (hereinafter, referred to as chloroprene) alone or a mixture of chloroprene and one or more monomers copolymerizable therewith in the presence of sulfur ($S_8$). The sulfur-modified chloroprene polymer of the present embodiment has a content of the sulfur that is bound to the sulfur-modified chloroprene polymer of 0.2 to 0.6 mass % with respect to the total amount of the rubber and a ratio of the amount of the bound sulfur (mass %) to the total amount of the sulfur contained in the entire rubber (mass %) (bound sulfur content/total sulfur content) adjusted to 0.28 to 0.5.

The monomers copolymerizable with chloroprene include, for example, 2,3-dichloro-1,3-butadiene, 1-chloro-1,3-butadiene, styrene, acrylonitrile, methacrylonitrile, isoprene, butadiene, methacrylic acid, the esters thereof and the like.

When the monomers copolymerizable with chloroprene are used, the content is adjusted to the range at which the properties of the obtained sulfur-modified chloroprene rubber are not impaired, preferably in the range of 10 mass % or less with respect to the total amount of the raw material monomers. It is possible to improve the heat resistance and the processing characteristics of the obtained sulfur-modified chloroprene rubber obtained by reducing the content of the monomers copolymerizable with chloroprene to 10 mass % or less.

For example when used, 2,3-dichloro-1,3-butadiene, among these copolymerizable monomers, can decrease the crystallization rate of the obtained sulfur-modified chloroprene rubber. A sulfur-modified chloroprene rubber having smaller crystallization rate can retain its rubber elasticity even under low-temperature environment.

[Bound Sulfur]

The sulfur-modified chloroprene polymer contained in the sulfur-modified chloroprene rubber of the present embodiment has a bound sulfur content adjusted to 0.2 to 0.6 mass % with respect to the total amount of the rubber. The bound sulfur, as used herein, means those sulfur atoms bound to the main chain and the terminal regions of the sulfur-modified chloroprene polymer. The amount of the sulfur bound to the sulfur-modified chloroprene polymer can be determined by removing the sulfur ($S_8$) not bound to the main chain and the terminal regions of the sulfur-modified chloroprene rubber polymer and also sulfur-containing compounds such as polymerization catalysts, aging inhibitors, polymerization inhibitors and plasticizers from the sulfur-modified chloroprene rubber by means of purifying the polymer with a mixed benzene: methanol solution at a rate of 3:5, freeze-drying the purified polymer once again, and analyzing the sample thus obtained by the oxygen combustion flask method of JIS K6233-1.

When the content of bound sulfur is less than 0.2 mass %, the sulfur-modified chloroprene polymer contained in the sulfur-modified chloroprene rubber of the present embodiment has an extremely small scorch time when obtained and hardens prematurely during molding processing. Alternatively when the bound sulfur content is more than 0.6 mass %, the obtained sulfur-modified chloroprene rubber becomes excessively tacky to metal and thus unprocessable. A bound sulfur content in the range of 0.25 to 0.5 mass % is more preferable, because the heat resistance of the obtained sulfur-modified chloroprene rubber is improved more efficiently.

The bound sulfur content may be controlled, for example, by adjustment of the addition amounts of the sulfur ($S_8$) added during polymerization and the sulfur-containing compounds containing sulfur atoms in the molecule, such as polymerization catalysts, aging inhibitors, polymerization inhibitors, and plasticizers, adjustment of the pH of the polymerization solution before isolation of the sulfur-modified chloroprene rubber (finishing pH) by a common freeze-solidification method, or regulation of the polymerization degree of the polymer.

[Bound Sulfur Content/Total Sulfur Content]

In the sulfur-modified chloroprene rubber of the present embodiment, the ratio of the amount of the bound sulfur (mass %) of the sulfur-modified chloroprene polymer to the total amount of the sulfur contained in the entire rubber (mass %) (bound sulfur content/total sulfur content) is adjusted in the range of 0.28 to 0.5.

The total sulfur content means the total content of all sulfur atoms contained in the entire sulfur-modified chloroprene rubber. It thus means the total amount of sulfur (mass %) including the bound sulfur described above, the sulfur not bound to the sulfur-modified chloroprene polymer ($S_8$), and the sulfur contained in the sulfur-containing compounds such as polymerization catalysts, aging inhibitors, polymerization inhibitors, and plasticizers contained in the sulfur-modified chloroprene rubber.

The total sulfur content in the sulfur-modified chloroprene rubber can be determined by analyzing the obtained sulfur-modified chloroprene rubber directly without purification by the oxygen combustion flask method described in JIS K6233-1.

When the ratio of the amount of the bound sulfur (mass %) of the sulfur-modified chloroprene polymer contained in the sulfur-modified chloroprene rubber of the present embodiment to the total amount of the sulfur contained in the entire rubber (mass %) (bound sulfur content/total sulfur content) is less than 0.28, it is not possible to improve effectively the heat resistance of the obtained sulfur-modified chloroprene rubber, thus leading to drastic reduction of the scorch time and premature hardening of the rubber during processing. Alternatively, when the sulfur-modified chloroprene rubber has a ratio of more than 0.5, it should be prepared under extremely high-temperature high-pressure condition and thus can be prepared only with difficulty.

When the ratio of the bound sulfur content in the sulfur-modified chloroprene polymer contained in the sulfur-modified chloroprene rubber of the present embodiment to the total sulfur content contained in the entire rubber is in the range of 0.3 to 0.45, it is possible to improve the heat resistance of the obtained sulfur-modified chloroprene rubber more effectively and thus, such a ratio is more preferable.

The ratio of the bound sulfur content in the sulfur-modified chloroprene polymer contained in the sulfur-modified chloroprene rubber of the present embodiment to the total sulfur content contained in the entire rubber can be controlled similarly to the methods of controlling the bound sulfur content, for example by adjustment of the pH of the polymerization solution before isolation of the sulfur-modified chloroprene rubber (finishing pH) by means of a common freeze-solidification method or regulation of the polymerization degree of the sulfur-modified chloroprene polymer.

<Method for Producing Sulfur-Modified Chloroprene Rubber>

Hereinafter, a method for producing the sulfur-modified chloroprene rubber in the first embodiment of the present invention will be described. The method for producing the sulfur-modified chloroprene rubber in the present embodiment is a method for producing a sulfur-modified chloroprene rubber comprising a polymerization step of obtaining a sulfur-modified chloroprene polymer containing sulfur atoms in the molecule by emulsion polymerization of chloroprene monomer alone or a mixture of chloroprene monomer and one or more other monomers in the presence of sulfur and a step of isolating the sulfur-modified chloroprene rubber from the polymerization solution by a freeze-solidification method, wherein the content of the sulfur that is bound to the sulfur-modified chloroprene polymer is 0.2 to 0.6 mass % with respect to the total amount of the rubber and the ratio of the amount of the bound sulfur (mass %) to the total amount of the sulfur contained in the entire rubber (mass %) (bound sulfur content/total sulfur content) is 0.28 to 0.5.

First in the polymerization step, chloroprene and, as needed, one or more other monomers are emulsion-polymerized in the presence of sulfur, to give a polymer.

In the emulsion polymerization, the amount of the sulfur ($S_8$) added is preferably 0.1 to 0.9 parts by mass, more preferably 0.3 to 0.7 parts by mass, with respect to 100 parts by mass of all monomers to be polymerized. It is thus possible to obtain a sulfur-modified chloroprene rubber superior in mechanical properties, dynamic properties, and processability. An excessively small content of sulfur ($S_8$) may give a sulfur-modified chloroprene rubber unsatisfactory in mechanical properties and dynamic properties. Alternatively an excessively large content of sulfur ($S_8$) may lead to excessively high tackiness to metal of the obtained sulfur-modified chloroprene rubber, prohibiting processing thereof.

The emulsifier for use in the emulsion polymerization is preferably rosin acids. The emulsifier may be used in combination with another commonly-used emulsifier or fatty acids described below. Examples of the other emulsifiers include metal salts of aromatic sulfone acid formalin condensates, sodium dodecylbenzenesulfonate, potassium dodecylbenzenesulfonate, sodium alkyldiphenylethersulfonates, potassium alkyldiphenylethersulfonates, sodium polyoxyethylene alkylethersulfonates, sodium polyoxypropylene alkylethersulfonates, potassium polyoxyethylene alkylethersulfonates, potassium polyoxypropylene alkylethersulfonates and the like. The rosin acids, as used herein, mean rosin acids, disproportionated rosin acids, alkali metal salts of the disproportionated rosin acids, or the compounds thereof.

Emulsifiers particularly favorably used include aqueous alkali soap solutions containing alkali-metal salts of disproportionated rosin acids and those containing a mixture of saturated or unsaturated fatty acids having a carbon number of 6 to 22. As the components for the disproportionated rosin acids are, for example, sesquiterpenes, 8,5-isopimaric acid, dihydropimaric acid, secodehydroabietic acid, dihydroabietic acid, deisopropyldehydroabietic acid, demethyldehydroabietic acid and the like.

The pH of the aqueous emulsion when the emulsion polymerization is initiated is desirably 10.5 to 13.0 and it is thus possible to carry out the polymerization reliably. The aqueous emulsion, as used herein, means a liquid mixture comprising chloroprene monomer, monomers copolymerizable with chloroprene, emulsifiers, sulfur ($S_8$) and others immediately before initiation of emulsion polymerization. Of course, the composition of the aqueous emulsion may vary, for example, if these monomers or sulfur ($S_8$) is added later or as they are divided. At a pH of less than 10.5, when a rosin acid is used as the emulsifier, it may not be possible to control polymerization reliably, for example due to polymer precipitation during the polymerization. Alternatively at a pH of more than 13.0, it may not be possible to control the Mooney viscosity of the obtained sulfur-modified chloroprene rubber. The pH of the aqueous emulsion can be controlled appropriately by modification of the amount of the alkali component, such as sodium hydroxide or potassium hydroxide, present during emulsion polymerization.

The polymerization temperature of emulsion polymerization is 0 to 55° C., preferably 30 to 55° C.

The polymerization initiator used is, for example, potassium persulfate, benzoyl peroxide, ammonium persulfate, or hydrogen peroxide that is commonly used in radical polymerization.

According to the production method of the present embodiment, the polymerization is carried out to a polymerization degree in the range of 60 to 95%, preferably of 70 to 95% and then terminated by addition of a polymerization inhibitor. It is thus possible to obtain a chloroprene rubber superior in heat resistance and processability. An excessively low polymerization degree may lead to drastic drop of the copolymerization amount with sulfur ($S_8$), prohibiting improvement in heat resistance of the obtained sulfur-modified chloroprene rubber. Alternatively, an excessively large polymerization degree may lead to development of branched structure and gel formation, which in turn leads to deterioration in processability of the obtained sulfur-modified chloroprene rubber.

The polymerization inhibitor used in preparation of the sulfur-modified chloroprene rubber polymer of the present embodiment is, for example, thiodiphenylamine, 4-tert-butylcatechol, 2,2'-methylene bis-4-methyl-6-tert-butylphenol or the like.

Unreacted monomers remaining in the polymerization solution after polymerization can be removed by a common method, for example by distillation under reduced pressure.

According to applications, the sulfur-modified chloroprene rubber may be used after the Mooney viscosity thereof is reduced. The method for reducing the Mooney viscosity of the sulfur-modified chloroprene rubber is not particularly limited, but it is possible to use, for example, a method of cleaving the molecular chains of the sulfur-modified chloroprene polymer by addition of at least one plasticizer selected from tetraalkylthiuram disulfides having alkyl groups having a carbon number of 1 to 7 and dialkyldithiocarbamate salts having alkyl groups having a carbon number of 1 to 7.

In regard to the timing of addition of these compounds, they may be added to the aqueous emulsion after emulsion polymerization and before removal of unreacted monomers or to the aqueous emulsion after removal of unreacted monomers. Depending on the amount of the plasticizer added, they may be added both before and after removal of unreacted monomers.

A small amount of stabilizer may be added to the sulfur-modified chloroprene rubber of the present embodiment for prevention of the change in Mooney viscosity during storage. Examples of such stabilizers include phenyl-α-naphthylamine, octylated diphenylamine, 2,6-di-tert-butyl-4-phenylphenol, 2,2'-methylene-bis(4-methyl-6-tert-butylphenol), 4,4'-thiobis-(6-tert-butyl-3-methylphenol) and the like. 4,4'-Thiobis-(6-tert-butyl-3-methylphenol) is preferable.

The sulfur-modified chloroprene rubber is then subjected to an isolation step, in which it is isolated by a common freeze-solidification method. According to the production method of the present embodiment, there may be a pH-adjusting step in which the pH of the polymerization solution is adjusted to 5.5 to 7.5, for example, with acetic acid before the isolation step. It is possible to regulate the content of the bound sulfur, prevent generation of aggregates, and thus isolate the rubber easily by the pH adjustment to 5.5 to 7.5.

As described above, the sulfur-modified chloroprene rubber of the present embodiment, which has a bound sulfur content of 0.2 to 0.6 mass % with respect to the total amount of the rubber and a ratio of the bound sulfur content (mass %) to the total sulfur content contained in the entire rubber (bound sulfur content/total sulfur content) of 0.28 to 0.5, shows improved heat resistance.

Second Embodiment

Hereinafter, the molded article according to the second embodiment of the present invention will be described. The molded article of the present embodiment, a product obtained by molding the sulfur-modified chloroprene rubber in the first embodiment, can be used favorably as a molded article for transmission belts, conveyer belts, antivibration rubbers, air springs, hoses, sponges and others.

Examples of the molding methods used in production of the molded article of the present embodiment include, but are not limited to, extrusion molding, injection molding, compression molding, calendering and the like.

The molded article of the present embodiment, which employs a sulfur-modified chloroprene rubber as the material for improvement of heat resistance, is resistant to thermal degradation of the rubber itself and also to reduction of the product lifetime even when exposed to the stimulus of heat.

EXAMPLES

Hereinafter, the present invention will be described more in detail with reference to Examples and Comparative Examples, but it should be understood that the present invention is not restricted by these Examples.

Example 1

Preparation of Sulfur-Modified Chloroprene Rubber

Placed in a polymerization tank having a capacity of 30 liters were 100 parts by mass of chloroprene monomer, 0.7 part by mass of sulfur, 105 parts by mass of purified water, 3.80 parts by mass of disproportionated rosin acid potassium (produced by Harima Chemicals, Inc.), 0.55 part by mass of sodium hydroxide, and 0.5 part by mass of sodium salt of β-naphthalenesulfonic acid formalin condensate (trade name: DEMOL N: produced by Kao Corp). 0.1 Part by mass of potassium persulfate was added thereto as polymerization initiator and the mixture was polymerized at a polymerization temperature of 40° C. under nitrogen stream. A polymerization terminator diethylhydroxyamine was added thereto when the reaction proceeded to a polymerization degree of 82% to terminate the polymerization. Unreacted monomers remaining in the polymerization solution after polymerization were removed by distillation under reduced pressure, to give a post-polymerization latex before plasticization (hereinafter, the post-polymerization latex will be referred to simply as "latex").

Subsequently, a plasticizer emulsion containing 3.0 parts by mass of chloroprene monomer, 2.0 parts by mass of tetraethylthiuram disulfide (trade name: NOCCELER TET, produced by Ouchi Shinko Chemical Industrial Co., Ltd.), 0.05 part by mass of sodium salt of β-naphthalene sulfonic acid formalin condensate, and 0.05 part by mass of sodium laurylsulfate was added to the latex and the mixture was kept at a temperature of 50° C. for 1 hour under agitating for plasticization.

The latex was then allowed to cool and adjusted to a pH of 6.0 by addition of acetic acid and the polymer was isolated by a common freeze-solidification method to give a sulfur-modified chloroprene rubber.

<Measurement of the Bound Sulfur Content (Mass %) in Sulfur-Modified Chloroprene Rubber>

The bound sulfur content was determined by preparing a sample by purifying the obtained sulfur-modified chloroprene rubber with a mixture solution of benzene and methanol at a benzene:methanol ratio of 3:5 and analyzing the sample by the oxygen combustion flask method defined by JIS K6233-1. The bound sulfur content (mass %) of the obtained sulfur-modified chloroprene rubber was 0.53 mass %.

<Measurement of the Ratio of Bound Sulfur Content (Mass %) to Total Sulfur Content (Mass %)>

For determination of the total sulfur content (mass %), the obtained sulfur-modified chloroprene rubber was analyzed directly without purification by the oxygen combustion flask method defined by JIS K6233-1.

The ratio was calculated from the total obtained sulfur content and the bound sulfur content described above according to the following Formula 1:

[Formula 1]

$$\text{Ratio of bound sulfur content to total sulfur content} = \frac{\text{Bound sulfur content (mass \%)}}{\text{Total sulfur content (mass \%)}} \quad \text{(Formula 1)}$$

The ratio of the bound sulfur content of the obtained sulfur-modified chloroprene polymer to the total sulfur content in the entire rubber was 0.36.

[Preparation of Sample for Evaluation of Heat Resistance]

100 parts by mass of the sulfur-modified chloroprene rubber was mixed with 1 part by mass of stearic acid, 2 parts by mass of octylated diphenylamine, 4 parts by mass of magnesium oxide, 40 parts by mass of carbon black (SRF), and 5.0 parts by mass of zinc oxide, using an 8-inch roll, and the mixture was crosslinked under pressure at 160° C. for 20 minutes, to give a test sample.

<Elongation at Break>

For evaluation of heat resistance, the elongations at break (%) of the test sample prepared were determined according to JIS K6257 before and after heat treatment at 100° C. for 500 hours and the elongation at break retention (%) was calculated according to the following Formula 2. A larger value of the elongation at break retention (%) indicates better heat resistance.

[Formula 2]

$$\text{Elongation at break retention (\%)} = \frac{\text{Elongation at break after heat treatment (\%)}}{\text{Elongation at break before heat treatment (\%)}} \times 100 \quad \text{(Formula 2)}$$

The elongation at break retention of the sample obtained was 55%.

<Permanent Compression Set>

The permanent compression set of the test sample was also determined. The permanent compression set at low temperature was determined under the test condition of 0° C. and 70 hours according to JIS K6262.

The permanent compression set of the obtained sample at low temperature was 95%.

Examples 2 to 8 and Comparative Examples 1 to 4

Samples were prepared in a manner similar to Example 1, except that the polymerization condition of Example 1 was replaced with that shown in Tables 1 to 3.

TABLE 1

|  |  | Example ||||
|---|---|---|---|---|---|
|  |  | 1 | 2 | 3 | 4 |
| Polymerization condition | Chloroprene (part by mass) | 100 | 100 | 100 | 100 |
|  | 2,3-Dichloro-1,3-butadiene (part by mass) | — | — | — | — |
|  | Sulfur (part by mass) | 0.7 | 0.7 | 0.45 | 0.45 |
|  | Tetraethylthiuram disulfide (part by mass) | 2 | 2 | 3 | 3 |
|  | Polymerization degree (%) | 82 | 74 | 77 | 75 |
|  | pH of the latex before isolation of the polymer by freeze-solidification method | 6 | 6.5 | 6.5 | 7 |
| Evaluation results | Bound sulfur content (mass %) | 0.53 | 0.46 | 0.27 | 0.31 |
|  | Total sulfur content (mass %) | 1.47 | 1.44 | 0.9 | 0.94 |
|  | Ratio of bound sulfur content to total sulfur content | 0.36 | 0.32 | 0.3 | 0.33 |
|  | Elongation at break before heat treatment (%) | 480 | 475 | 492 | 485 |
|  | Elongation at break after heat treatment (%) | 264 | 257 | 290 | 281 |
|  | Elongation at break retention (%) | 55 | 54 | 59 | 58 |
|  | Permanent compression set at low temperature (%) | 95 | 93 | 96 | 95 |

TABLE 2

|  |  | Example ||||
|---|---|---|---|---|---|
|  |  | 5 | 6 | 7 | 8 |
| Polymerization condition | Chloroprene (part by mass) | 100 | 97 | 100 | 100 |
|  | 2,3-Dichloro-1,3-butadiene (part by mass) | — | 3 | — | — |
|  | Sulfur (part by mass) | 0.45 | 0.7 | 0.7 | 0.7 |
|  | Tetraethylthiuram disulfide (part by mass) | 3 | 2 | 2 | 2 |
|  | Polymerization degree (%) | 85 | 76 | 76 | 79 |
|  | pH of the latex before isolation of the polymer by freeze-solidification method | 7 | 6.5 | 8 | 5 |
| Evaluation results | Bound sulfur content (mass %) | 0.41 | 0.44 | 0.5 | 0.45 |
|  | Total sulfur content (mass %) | 0.91 | 1.47 | 1.43 | 1.45 |
|  | Ratio of bound sulfur content to total sulfur content | 0.45 | 0.3 | 0.35 | 0.31 |
|  | Elongation at break before heat treatment (%) | 470 | 500 | 471 | 477 |
|  | Elongation at break after heat treatment (%) | 273 | 275 | 236 | 234 |
|  | Elongation at break retention (%) | 58 | 55 | 50 | 49 |
|  | Permanent compression set at low temperature (%) | 92 | 55 | 97 | 95 |

TABLE 3

|  |  | Comparative Example ||||
|---|---|---|---|---|---|
|  |  | 1 | 2 | 3 | 4 |
| Polymerization condition | Chloroprene (part by mass) | 100 | 100 | 100 | 100 |
|  | 2,3-Dichloro-1,3-butadiene (part by mass) | — | — | — | — |
|  | Sulfur (part by mass) | 0.8 | 0.3 | 0.7 | 0.45 |
|  | Tetraethylthiuram disulfide (part by mass) | 1.5 | 4 | 2 | 3 |
|  | Polymerization degree (%) | 84 | 76 | 61 | 93 |
|  | pH of the latex before isolation of the polymer by freeze-solidification method | 6 | 6.5 | 6 | 6.5 |

TABLE 3-continued

|  |  | Comparative Example | | | |
|---|---|---|---|---|---|
|  |  | 1 | 2 | 3 | 4 |
| Evaluation results | Bound sulfur content (mass %) | 0.62 | 0.18 | 0.35 | 0.4 |
|  | Total sulfur content (mass %) | 1.55 | 0.64 | 1.46 | 0.78 |
|  | Ratio of bound sulfur content to total sulfur content | 0.4 | 0.28 | 0.24 | 0.51 |
|  | Elongation at break before heat treatment (%) | Sample unprepared because of adhesion to rolls | Sample unprepared because of scorching during kneading | 495 | 468 |
|  | Elongation at break after heat treatment (%) |  |  | 193 | 206 |
|  | Elongation at break retention (%) |  |  | 39 | 44 |
|  | Permanent compression set at low temperature (%) |  |  | 92 | 93 |

As obvious from Tables 1 to 3 above, the sulfur-modified chloroprene rubbers of Examples 1 to 8 were not inferior in permanent compression set at low temperature and yet superior in elongation at break retention, an indicator of heat resistance to the sulfur-modified chloroprene rubbers of Comparative Examples 3 and 4.

In Comparative Example 1, wherein the sulfur-modified chloroprene polymer had a bound sulfur content of more than 0.6 mass %, it was not possible to prepare and evaluate the sample because of adhesion of the sulfur-modified chloroprene rubber to rolls. Alternatively in Comparative Example 2, wherein the sulfur-modified chloroprene polymer had a bound sulfur content of less than 0.2 mass %, it was not possible to prepare and evaluate the sample because of scorching of the polymer during kneading.

In Comparative Example 3, wherein the ratio of the bound sulfur content in the sulfur-modified chloroprene polymer to the total sulfur content contained in the entire rubber (bound sulfur content/total sulfur content) was less than 0.28, i.e., there was an excessive amount of sulfur not bound to the polymer, the rubber had smaller elongation at break retention. Alternatively in Comparative Example 4, wherein the ratio of the bound sulfur content in the sulfur-modified chloroprene polymer to the total sulfur content contained in the entire rubber (bound sulfur content/total sulfur content) was more than 0.5 and thus there was an excessively smaller amount of polymer-unbound sulfur, the test sample was not crosslinked sufficiently when prepared and had smaller elongation at break retention.

The elongation at break retention was larger in Example 7 than in Comparative Examples 1 to 4, but smaller than in other Examples, particularly in Examples 1 to 6. It is probably because the test sample was not sufficiently solidified when frozen, because the pH of the polymerization solution before isolation by the freeze-solidification method was more than 7.5.

The elongation at break retention was larger in Example 8 than in Comparative Examples 1 to 4, but smaller than in other Examples, particularly in Examples 1 to 6. It would be probably due to the fact that because the pH of the polymerization solution was more than 5.5 before isolation by the freeze-solidification method, there were aggregates generated and the aggregates contaminated the isolated sulfur-modified chloroprene rubber.

The compounds used in preparation of the sample for evaluation of heat resistance were mixed with each of the sulfur-modified chloroprene rubbers prepared in Examples 1 to 8, using an 8-inch roll, and the mixture was molded and vulcanized, to give a transmission belt. The transmission belts thus obtained were superior in heat resistance, similarly to the samples for evaluation of heat resistance.

The compounds used in preparation of the sample for evaluation of heat resistance were mixed with each of the sulfur-modified chloroprene rubbers prepared in Examples 1 to 8, using an 8-inch roll, and the mixture was molded and vulcanized, to give a conveyor belt. The conveyer belts thus obtained were superior in heat resistance, similarly to the samples for evaluation of heat resistance.

The compounds used in preparation of the sample for evaluation of heat resistance were mixed with each of the sulfur-modified chloroprene rubbers prepared in Examples 1 to 8, using an 8-inch roll, and the mixture was molded and vulcanized, to give an antivibration rubber. The antivibration rubbers thus obtained were superior in heat resistance, similarly to the samples for evaluation of heat resistance.

The compounds used in preparation of the sample for evaluation of heat resistance were mixed with each of the sulfur-modified chloroprene rubbers prepared in Examples 1 to 8, using an 8-inch roll, and the mixture was molded and vulcanized, to give an air spring for automobiles. The air springs for automobiles thus obtained were superior in heat resistance, similarly to the samples for evaluation of heat resistance.

The compounds used in preparation of the sample for evaluation of heat resistance were mixed with each of the sulfur-modified chloroprene rubbers prepared in Examples 1 to 8, using an 8-inch roll, and the mixture was molded and vulcanized, to give a hose. The hoses thus obtained were superior in heat resistance, similarly to the samples for evaluation of heat resistance.

The compounds used in preparation of the sample for evaluation of heat resistance were mixed with each of the sulfur-modified chloroprene rubbers prepared in Examples 1 to 8, using an 8-inch roll, and the mixture was molded and vulcanized, to give a sponge. The sponges thus obtained were superior in heat resistance, similarly to the samples for evaluation of heat resistance.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A sulfur-modified chloroprene rubber comprising, as the principal component, a sulfur-modified chloroprene polymer having sulfur atoms in the molecule which is obtained by emulsion polymerization of chloroprene alone or a mixture of chloroprene and one or more other monomers in the presence of sulfur, and wherein tetraethylthiuram disulfide has been used as a plasticizer, wherein:

the content of the sulfur that is bound to the sulfur-modified chloroprene polymer is 0.2 to 0.6 mass % with respect to the total amount of the rubber; and the ratio of the amount of the bound sulfur (mass %) to the total amount of the sulfur contained in the entire rubber (mass %) (bound sulfur content/total sulfur content) is 0.3 to 0.45.

2. The sulfur-modified chloroprene rubber according to claim 1, wherein the polymerization degree of the sulfur-modified chloroprene polymer is 60 to 95%.

3. The sulfur-modified chloroprene rubber according to claim 1, prepared by emulsion polymerization of the raw monomer mixture containing the other monomers in an amount of 10 mass % or less.

4. A molded article, prepared from the sulfur-modified chloroprene rubber according to claim 1.

5. A method for producing a sulfur-modified chloroprene rubber comprising:

a polymerization step of obtaining a sulfur-modified chloroprene polymer containing sulfur atoms in the molecule by emulsion polymerization of chloroprene monomer alone or a mixture of chloroprene and one or more other monomers in the presence of sulfur;

a step of adding tetraethylthiuram disulfide in a ratio of 2 to 3 parts by mass with respect to 100 parts by mass of all monomers to be polymerized; and a step of isolating the sulfur-modified chloroprene rubber from the polymerization solution obtained in the polymerization step by a freeze-solidification method, wherein:

the content of the sulfur that is bound to the sulfur-modified chloroprene polymer is 0.2 to 0.6 mass % with respect to the total amount of the rubber; and the ratio of the amount of the bound sulfur (mass %) to the total amount of the sulfur contained in the entire rubber (mass %) (bound sulfur content/total sulfur content) is 0.3 to 0.45.

6. The method for producing a sulfur-modified chloroprene rubber according to claim 5, comprising additionally a pH-adjusting step of adjusting the pH of the polymerization solution containing the sulfur-modified chloroprene polymer to 5.5 to 7.5, before the step of isolating the sulfur-modified chloroprene rubber.

7. The method for producing a sulfur-modified chloroprene rubber according to claim 5, wherein the polymerization in the polymerization step is carried out to a polymerization degree of the sulfur-modified chloroprene polymer at 60 to 95%.

8. The method for producing a sulfur-modified chloroprene rubber according to claim 5, wherein the raw monomer mixture containing the other monomers in an amount of 10 mass % or less is used for emulsion polymerization in the polymerization step.

9. The sulfur-modified chloroprene rubber according to claim 2, prepared by emulsion polymerization of the raw monomer mixture containing the other monomers in an amount of 10 mass % or less.

10. A molded article, prepared from the sulfur-modified chloroprene rubber according to claim 2.

11. A molded article, prepared from the sulfur-modified chloroprene rubber according to claim 3.

12. The method for producing a sulfur-modified chloroprene rubber according to claim 6, wherein the polymerization in the polymerization step is carried out to a polymerization degree of the sulfur-modified chloroprene polymer at 60 to 95%.

13. The method for producing a sulfur-modified chloroprene rubber according to claim 6, wherein the raw monomer mixture containing the other monomers in an amount of 10 mass % or less is used for emulsion polymerization in the polymerization step.

14. The method for producing a sulfur-modified chloroprene rubber according to claim 7, wherein the raw monomer mixture containing the other monomers in an amount of 10 mass % or less is used for emulsion polymerization in the polymerization step.

15. The method for producing a sulfur-modified chloroprene rubber according to claim 5, wherein the amount of the sulfur is 0.45 to 0.7 parts by mass with respect to 100 parts by mass of all monomers to be polymerized.

* * * * *